United States Patent [19]

Hsu et al.

[11] Patent Number: 4,949,539
[45] Date of Patent: Aug. 21, 1990

[54] MUFFLER WITH A PURIFYING SYSTEM FOR CAR OR MOTORCYCLE

[76] Inventors: Chi-chu Hsu, 4f No. 144, Chu Lin Rd., Yung Ho; Chin-ching Yu, 31, Lane 4, Tunhua N. Rd.; Suyueh Chao, 2-1, Lane 162, Szu Wei Rd.; Miguel Huang, 183, Nei-hu Rd. Sect. 2, all of Taipei City, Taiwan

[21] Appl. No.: 323,419

[22] Filed: Mar. 14, 1989

[51] Int. Cl.⁵ .............................................. E01N 3/04
[52] U.S. Cl. ......................................... 60/275; 60/310; 60/315; 55/228; 55/229; 55/233; 55/249; 55/DIG. 30; 422/169
[58] Field of Search ............... 60/315, 310, 275; 55/228, 229, 233, 249, DIG. 30; 422/169

[56] References Cited

U.S. PATENT DOCUMENTS

| | | | |
|---|---|---|---|
| 3,074,390 | 1/1963 | O'Laughlin | 60/275 |
| 3,311,097 | 3/1967 | Mittelstaedt | 60/275 |
| 3,618,314 | 11/1971 | Krebs | 60/310 |
| 3,642,259 | 2/1972 | Bowden | 60/310 |
| 3,712,031 | 1/1973 | Cruz | 60/310 |
| 3,737,515 | 6/1973 | Veloso | 60/310 |

Primary Examiner—Douglas Hart
Attorney, Agent, or Firm—Morton J. Rosenberg; David I. Klein

[57] ABSTRACT

This invention relates to a muffler having a purifying system for separating solid contents and eliminating poisonous gases such as carbon monoxide by means of an electrolysis apparatus which continuously provides oxygen separated from water to react with the carbon monoxide into carbon dioxide.

7 Claims, 2 Drawing Sheets

MUFFLER WITH A PURIFYING SYSTEM FOR CAR OR MOTORCYCLE

BACKGROUND OF THE INVENTION

This invention relates to a muffler, and particularly to a muffler with a purifying system for a car or motorcycle.

Conventionally, a muffler is connected to the exhaust end of an engine of a car or motorcycle for muffling or silencing the noise of the exhaust gases with harmfully contents such as carbon monoxide, nitrogen dioxide, sulfur dioxide and lead, which cause a serious air pollution to the environment in, especially, crowded areas or during rush hours. To this end, the inventor has attempted to make an improved muffler to overcome the drawbacks of a known muffler.

SUMMARY OF THE INVENTION

It is an object of this invention to provide a muffler which can diminish the disadvantages of a known muffler.

It is another object of this invention to provide a muffler with a purifying system for purifying exhaust gases of engine of a car or motorcycle.

With the above object in view, this invention provides a muffler with a purifying system for a car or motorcycle comprising a muffler having a case equally and vertically separated into two communicating compartments respectively having an inlet end and an outlet end, and a purifying system having two sets of strainers with intervals formed therein, respectively located within and across mid portions of the compartments, water spray means with a plurality of spray nozzles indicated substantially downwards, located in upper portions of the compartments and extending over the strainers, a pump for transferring water to the water spray means, a water pipe line with one end connected to the pump and the other end communicated with a lower portion of the inner space of the case, and an electrolysis apparatus having layers of brass nets extended in the intervals of the strainers and connected to a positive electrode thereof.

BRIEF DESCRIPTION OF THE DRAWINGS

A preferred embodiment of the invention will now be described, by way of example only, with reference to the accompanying drawings in which.

DETAILED DESCRIPTION OF THE PREFERRED EMBODIMENT

Figure 1:
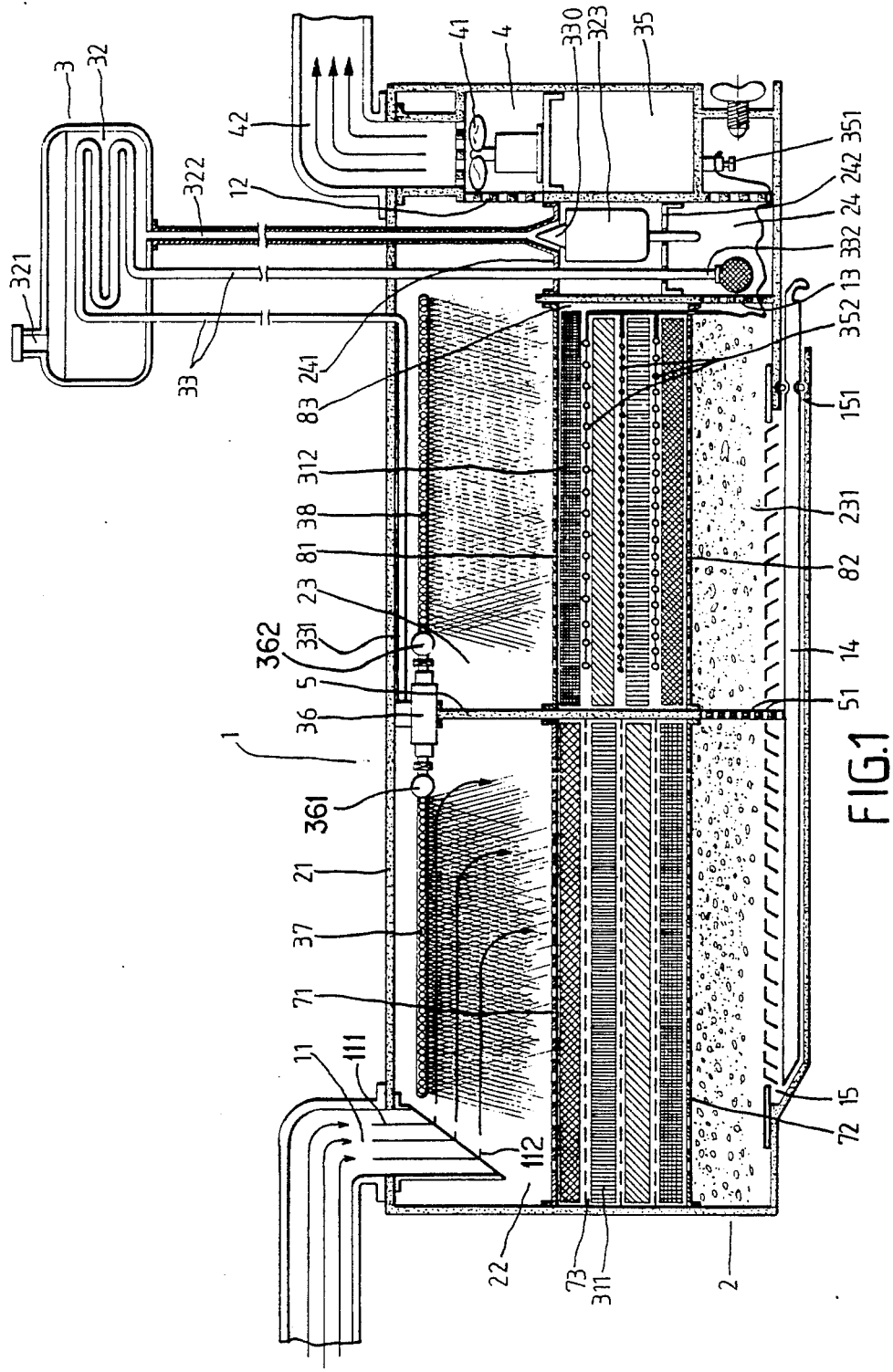
FIG. 1 is a cross-sectional view of a preferred embodiment according to this invention.

As shown in FIG. 1, a muffler with a purifying system generally indicated by numeral 1 essentially comprises a muffler generally indicated by numeral 2, a purifying system generally indicated by numeral 3 and an aspiration member generally indicated by numeral 4.

The muffler 2 includes a case 21, subatantially equally separated into a first compartment 22 and a second compartment 23 mainly by means of a vertical partition board 5 having a plurality of perforations 51 formed in a lower portion thereof, communicating the two compartments 22, 23, a pair of first porous frame 71, 72 and second porous frames 81, 82 respectively located within and across mid portions of the first compartment 22 and the second compartment 23 with spaces 73, 83 inbetween, an inlet port 11 formed in an upper portion of one side of the case 21, an outlet port 12 formed in an upper portion of the other side, a disposable collector 14 placed in a well portion 15 formed in the bottom wall for collecting deposits which can be periodically taken out by drawing out the collector 14 through an opening 151, and a dispensing board 39 extending over the well portion 15 and having a plurality of perforations which communicate the compartments 22, 23 and the well 15, and angle plates sloped downwardly.

Interconnecting an exhaust end of an engine (not shown) and the inlet port 11 is a conduit having a series of baffles 111 which are provided within the inner space of and along the inlet portion of the conduit with side edges oppositely attached to the inner side wall thereof and have respective angled ends 112 extending horizontally to lead exhaust gases flowing horizontally into the first compartment 22 between the porous frame 71 and a spray duct 37 which is to be described hereinafter. The perforations 51 in the partition board 5 are formed below the frames 72, 82.

The purifying system 3 comprises two sets of layers of strainers 311, 312 installed within and across the spaces 73, 83, a water feed pump 36 with the bottom supported by a T-shaped end of the partition board 5 and the top end attached to an inner side wall of the top wall of the case 21, having lateral spray ducts 37, 38 extending horizontally in upper portions of the compartments 22, 23 and laterally connected to outlet ends of the water feed pump 36 via respective high frequency oscillators 361, 362 for vibrating water into mist after spraying, a circulating pipe line 33 with an outlet end 331 connected to the inlet end of the feed water pump 36 and an inlet end 332 communicating with a lower compartment 231, located in the second compartment 23 between the frame 82 and the bottom wall of the case 21, via an outlet port 13, a water level control mechanism and an electrolysis apparatus 35.

A plurality of spay nozzles directed substantially downwards are evenly formed in the spray ducts 37, 38.

The water level control mechanism comprises a water supply tank 32 having a hole 321 for adding water into the tank 32, communicating with a third compartment 24 of the case 21 at a top wall 241 thereof via a pipe 322 with a divergent end, a float 323 upwards and downwards movably mounted in an upper portion of the third compartment 24 by means of a frame 242 located therein with a substantially cone-shaped head adapted to be engaged with the divergent end to close the outlet end of the pipe 322.

The water level control mechanism thus arranged can normally maintain the water level in the case 21 higher than the inlet end 332 of the circulating pipe line 33, and preferably below the frames 71, 81.

The electrolysis apparatus 35 is a conventional one having layers of brass nets 352 extended in intervals among the strainers 312 and preferably alternated with the strainers 312 and connected to a positive electrode 351 thereof for separating water into hydrogen and oxgen with which poisonous carbon monoxide may be reacted into carbon dioxide.

The aspiration member 4 mainly comprises a fan 41 provided for sucking treated gases through the outlet port 12 and further discharging to atmosphere through a discharge pipe 42.

Figure 2:
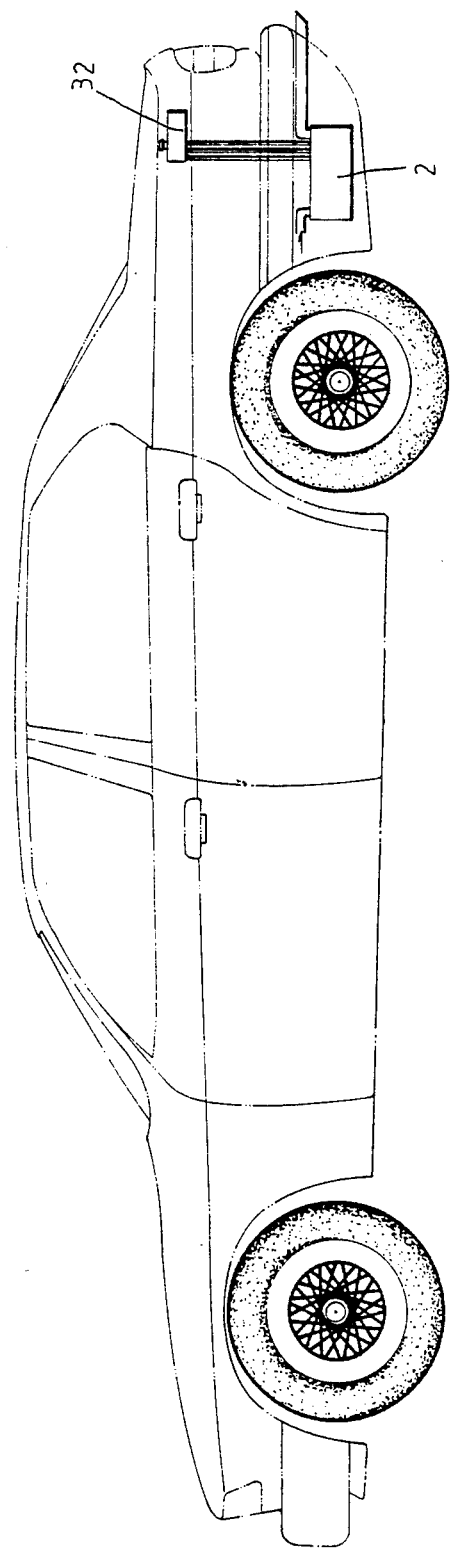
FIG. 2 is a side elevational view of the muffler shown in FIG. 1 which is installed in a car.

In assembly, as shown in FIG. 2, the muffler 2 is assembled in a car in an usual way while the feed water tank 32 is properly fitted in the trunk of the car.

In operation, exhaust gases are fed through the conduit into the first compartment 22 of the case 21 between the spray duct 37 and the frame 71 are mixed with tiny water drops or mist which is previously prior to being sprayed before spraying from the spray duct 37 and forced downwardly through the strainers 311 to be separated into a number of flows for facilitating mixing of the mist and the exhaust gases. The exhaust gases thus treated further flow from the lower compartment of the first compartment 22 into the lower compartment of the second compartment 23, in which the spray duct 38 is spraying water, through the perforations 51 in the partition board 5 under suction of the fan 41 and back pressure of the following exhaust gases. Then the exhaust gases will pass upwardly through the strainers 312 wherein the exhaust gases can further be separated therethrough, and oxygen is continuously provided by means of the electrolysis apparatus 35 passing a current through nets 352 in order to react with carbon monoxide and conversion to carbon dioxide, and sequentially flow against the sprayed water flow from the spray duct 38 to be finally purified prior to discharge to the atmosphere by means of the aspiration member 4.

It can be seen that the exhaust gases expanding in the muffler 2 are disturbed by the spraying water flow of which the tiny drips of mist may catch particles to capture the polluting sulfur dioxide and nitrogenoxide contained in the exhaust gases that facilitates complete separations of the solid contents therefrom. Moreover, poisonous gases such as carbon monoxide are fully reacted with oxygen into carbon dioxide.

Although water is not solvent to Lead and Hydrocarbons, said contents can also be removed by sinking into the collector 14.

The exhaust gases thus treated are thoroughly purified and preventing from air pollutions.

The deposits such as mixture of the solid contents and water will sink into the collector 14 and clean out periodically.

While the invention has been described with what is presently considered to be the most practical and preferred embodiment, it is to be understood that the invention is not to be limited to the disclosed embodiment, but, on the contrary, is intended to cover various modifications and equivalent arrangements included within the spirit and scope of the appended claims, which scope is to be accorded the broadest interpretation so as to encompass all such modifications and equivalent structure.

What is claimed is:

1. A muffler with a purifying system comprising:
   a muffler having a case equally and vertically separated into two communicating compartments respectively having an inlet end for leading in exhaust gases and an outlet end; and
   a purifying system having two sets of strainers with intervals formed therein, respectively located within and across mid portions of the compartments, water spray means with a plurality of spray nozzles indicated substantially downwards, located in upper portions of the compartments and extending over the strainers, a pump for transferring water to the water spray means, a water pipe line with one end connected to the pump and the other end communicated with a lower portion of an inner space of the case, and an electrolysis apparatus having layers of brass nets extended in the intervals of the strainers and connected to a positive electrode thereof.

2. A muffler with a purifying system as claimed in claim 1, wherin an aspiration member comprising a fan and a discharge pipe is communicatedly attached to the outlet end of the case.

3. A muffler with a purifying system as claimed in claim 1, wherein a water tank is fitted at a position higher than the case and has a hole for adding water into the tank and a pipe connected to the case at a level equal to or below the strainers through a water level control means.

4. A muffler with a purifying system as claimed in claim 3, wherein the water level control means comprises a float upwards and downwards movably mounted on a frame member located in the case, having an upper portion adapted to close an outlet end of the pipe interconnecting the water tank and the case.

5. A muffler with a purifying system as claimed in claim 1, wherein a well portion is further provided in a bottom of the case in which a collector is placed for collecting deposits.

6. A muffler with a purifying system as claimed in claim 1, wherein the case further comprises a guider means having a conduit connected to the inlet end and a plurality of baffles spacedly formed in the inlet end of the conduit.

7. A muffler with a purifying system as claimed in claim 6, wherein each of the baffles further has an angle extending horizontally.

* * * * *